US006893193B2

(12) United States Patent
Santha (10) Patent No.: US 6,893,193 B2
(45) Date of Patent: May 17, 2005

(54) SELF-ANCHORING FIBER BLOCK SYSTEM

(76) Inventor: B. Lanka Santha, 365 Toccoa Pl., Jonesboro, GA (US) 30236

( * ) Notice: Subject to any disclaimer, the term of this patent is extended or adjusted under 35 U.S.C. 154(b) by 56 days.

(21) Appl. No.: 10/354,310

(22) Filed: Jan. 30, 2003

(65) Prior Publication Data

US 2003/0143026 A1 Jul. 31, 2003

Related U.S. Application Data

(60) Provisional application No. 60/354,072, filed on Jan. 30, 2002.

(51) Int. Cl.$^7$ .............................................. E02D 17/20
(52) U.S. Cl. ....................... 405/302.6; 405/15; 405/284
(58) Field of Search .............................. 405/16, 17, 21, 405/30, 31, 32, 262, 302.6, 302.7, 302.4, 15, 284

(56) References Cited

U.S. PATENT DOCUMENTS

| | | | |
|---|---|---|---|
| 4,960,349 A | 10/1990 | Willibey et al. | ............. 405/262 |
| 5,091,247 A | 2/1992 | Willibey et al. | ............. 428/255 |
| 5,161,917 A * | 11/1992 | Papetti | ........................ 405/284 |
| 5,338,131 A | 8/1994 | Bestmann | ..................... 405/24 |
| 5,425,597 A | 6/1995 | Bestmann | ..................... 405/24 |
| 5,605,416 A | 2/1997 | Roach | .......................... 405/21 |
| 5,641,244 A | 6/1997 | Bestmann | ..................... 405/16 |
| 5,651,641 A | 7/1997 | Stephens et al. | ............ 405/258 |
| 5,658,096 A * | 8/1997 | Von Kanel | ............... 405/302.4 |
| 5,678,954 A | 10/1997 | Bestmann | ..................... 405/24 |
| 5,735,640 A | 4/1998 | Meyer et al. | ................ 405/258 |
| 5,951,202 A | 9/1999 | Brown | ......................... 405/19 |
| 6,168,349 B1 | 1/2001 | Perslow et al. | ................ 405/16 |
| 6,234,721 B1 | 5/2001 | Cronkhite et al. | ........... 405/284 |
| 6,267,533 B1 | 7/2001 | Bourg | .......................... 405/16 |
| 6,547,493 B2 * | 4/2003 | Spangler et al. | .......... 405/302.6 |

FOREIGN PATENT DOCUMENTS

| | | | | |
|---|---|---|---|---|
| EP | 0480890 A1 | * | 10/1991 | ........... E02D/17/20 |
| JP | 59126824 A | * | 7/1984 | ........... E02D/17/20 |
| JP | 03055316 A | * | 3/1991 | ........... E02D/17/18 |
| JP | 03233021 A | * | 10/1991 | ........... E02D/17/18 |
| JP | 06212609 A | * | 8/1994 | ............. E02B/3/04 |

OTHER PUBLICATIONS

B. Lanka Santha, Product Brochure, first published BY RoLanka International, Inc. on Feb. 25, 2002, at International Erosion Control Association meeting in Orlando, Florida.

* cited by examiner

*Primary Examiner*—Frederick L. Lagman
*Assistant Examiner*—Lisa M. Saldano
(74) *Attorney, Agent, or Firm*—Weatherly Kerven LLC (57) ABSTRACT

A fiber block segment suitable for controlling erosion and stabilizing soil is described that comprises an elongated fiber block formed of a densely packed elongated thick fibrous material. The fiber block is wrapped with a fabric around three sides so that the fabric defines a top anchor portion and a bottom anchor portions extending from the block. The fiber block is securely attached to the wrapped fabric by another fabric or twine spanning the fourth side of the block. Additionally, the fabric is wrapped only up to the edges defining one end (a male end) and beyond the edges defining the opposite end (the female end) to define a pouch-like structure at the female end. The fiber block is made of coconut fibers (coir). The fabric is woven from coir twine, and coir twine secures the fabric to the fiber block.

41 Claims, 9 Drawing Sheets

SELF-ANCHORING FIBER BLOCK SYSTEM

I. CROSS REFERENCE TO RELATED APPLICATIONS

This application claims priority to U.S. Provisional Patent Application Ser. No. 60/354,072 entitled "Self-anchoring fiber block system for shoreline and waterway bank restoration" filed Jan. 30, 2002.

II. BACKGROUND OF THE INVENTION

The invention relates to a self-anchoring fiber block system for lining lake or ocean shorelines or the banks of streams or rivers to control erosion of the soil near the water's edge and to promote growth of environmentally friendly vegetation near the waterline. Urban development has led to construction of more and more impervious solid surfaces such as parking lots and paved roads among other man-made structures that impede the natural watershed's ability to absorb and filter rainwater carrying silt from soil erosion and other pollutants before it runs off into streams and other waterways. This unfiltered runoff harms the environment by increasing pollution levels in the waterways within the watershed. The increased runoff also increases the danger of flash flooding and flows through the watershed at increased velocities. The faster the runoff flows through existing waterways and the higher the volume of the runoff, the more the runoff erodes the banks of the waterways and the more the runoff harms the ecosystem of the watershed. Additionally, severe washouts along the banks of the eroded waterway may damage property located near the banks.

Various structures and methods exist for stabilizing waterway banks and shorelines. One current method for stabilizing the banks of a waterway is to line the banks of a waterway or shoreline with concrete. However, this method completely destroys the localized ecosystem along the bank because it requires completely removing the vegetation growing along the bank. This method also eliminates or reduces the size of much needed green spaces in urban areas.

Another method of stabilizing the banks of a waterway is to stack rocks or boulders along the banks or shorelines to create riprap. Along with the disadvantages inherent in concrete lining, the use of riprap alongside waterways can block water flow during severe flow conditions if pieces of the riprap move from their intended locations. Additionally, both concrete and riprap are expensive to install on waterway banks and shorelines.

U.S. Pat. Nos. 5,338,131; 5,425,597; 5,641,244; and 5,678,954 to Bestmann describe prior methods of preventing waterway banks and shoreline erosion by placing various objects along a waterway to promote vegetation growth, initially on the objects themselves and later on the banks and shorelines. Although various methods described in Bestmann's patents involve the growth of vegetation as a mechanism for slowing or eliminating erosion on waterway banks and shorelines, they all have a common problem in installation of the objects. Bestmann extensively uses anchors to install his erosion control objects in waterway banks and shorelines including wooden stakes, steel cables, and anchor plates, each of which suffer from various deficiencies. Because Bestmann's wooden stakes are submerged under water but not buried in the soil, their buoyancy causes them to loosen and eventually work free from their anchoring position, which can cause the erosion control system to fail. Bestmann's wooden stakes can also rot and lose their structural integrity within short period of time when compared to the coir material used in much of the remaining structure in Bestmann's erosion control systems. Bestmann's wooden stakes also require extensive labor, which increases the costs associated with using Bestmann's erosion control systems. Bestmann's steel anchoring structures do not float or rot quickly, but they also require extensive labor. These steel anchoring structures may also be prohibited in many environmentally sensitive areas. Therefore, there is a need for waterway bank and shoreline protection and restoration system, which is capable of protecting waterway bank and shoreline over an extended time and with an environmentally friendly and stable anchoring structure and method. Furthermore, the system should promote growth of vegetation on it and protected waterway bank and shoreline.

Bestmann's erosion control systems also suffer the disadvantage of having structurally weak connections between the erosion control objects when the objects are installed over an extended length to cover long sections of a shoreline or bank. When the objects described by Bestmann are placed end-to-end along the length of the protected area shoreline or bank they tend to shift from their alignment with each other over time. The shift in alignment exposes the soil between the objects to water and thus erosion.

U.S. Pat. No. 6,234,721 to Cronkhite et al. describes an erosion prevention block of a hollow and L-shaped plastic block. Use of these blocks in waterway banks and shorelines to stop erosion is not an environmental friendly approach. When installed, these block systems behave similar to a concrete wall in that they remain virtually indefinitely and they inhibit growth of vegetation on the protected surface. Moreover, these blocks are complicated to handle during installation. Because these blocks are permanent structures, they must be removed if the waterway on which they are installed is expanded. Once removed, these plastic blocks are very difficult to dispose of properly because they are not biodegradable. Moreover, environmental regulations make using these plastic blocks in environmentally sensitive wetland and wildlife habitat difficult if not impossible.

U.S. Pat. No. 5,951,202 to Brown describes a shoreline erosion control system for installation on a shoreline or waterway bank. Brown's system is anchored to the shoreline or bank using cables, steel anchor piles, and metal staples (see FIGS. 2–4). These anchors are expensive and their installation is labor intensive. Brown also describes the use of metallic mesh, a synthetic erosion mat, and wire mesh, none of which is biodegradable. Moreover, synthetic nets of the type described by Brown can entrap and kill reptiles, birds, and fish leading to trap them and eventually kill them. Therefore, it is difficult, if not impossible to use these materials in environmentally sensitive wetland and wildlife habitat promoting areas.

U.S. Pat. No. 6,267,533 to Bourg describes a shoreline erosion control system comprising interlocking and layered elements made of concrete. Once installed, this system behaves like a paved concrete surface. Because Bourg's erosion control system suffers all the problems inherent with the concrete lining method described earlier, it is inappropriate to use them along environmentally sensitive watershed and wildlife habitat areas.

U.S. Pat. No. 6,168,349 to Perslow, et al. describes a system for lining a bank of a waterway. The system comprises two parallel linings of soil cement along the waterway bank. Placing soil cement process includes removal of soil along the bank, mixing them with cement and water, placing them back and compacting. If the soil in the bank is not suitable for soil cement process, suitable soil has to be imported from another site. Therefore, placing soil cement on a waterway bank is expensive and time consuming. Moreover, Perslow, et al's soil cement waterway bank lining system is not friendly to ecosystem along the waterway bank. Soil cement does not promote growth of vegetation and it does function as a natural wildlife habitat.

III. SUMMARY OF THE INVENTION

The invention is a self-anchoring fiber block system that can be positioned along a shoreline or waterway bank to stabilize the shoreline or waterway bank by preventing soil erosion, supporting the soil behind the system (i.e., the soil on the other side of the system from the water) and promoting growth of vegetation. The structure is easy to install, made of natural materials, friendly to wildlife habitat, protects the shoreline or waterway bank against erosion from its installation onward, promotes growth of vegetation along the shoreline or waterway bank, and can be anchored in place with few, if any, separate anchoring structures. Because the fiber block system is made of natural materials and controls erosion so effectively, it may be installed closer to the water to protect as much of the shoreline or waterway bank from erosion as is desired. The natural materials of which the fiber block system is made can also support vegetation growth in the fiber block system itself. Thus, vegetation can be implanted in the fiber block system itself in a manner that protects the vegetation from forces of erosion and accelerates its growth along the shoreline or waterway. The fiber block system can be made of interlocking fiber block segments that connect easily and without the need for specialized tools or connecting hardware. The fiber block system also protects the bare soil behind (in relation to the water) the structure from erosion because, among other reasons, it is thick enough to function as a barrier between the soil and the water. Thus, the fiber block system promotes growth of vegetation in the soil behind the structure also. Because the fiber block segments can be stacked atop each other, the installer can construct an artificial bank of a chosen elevation to further control the path of water flowing in a waterway or shape the shoreline. The embodiment of the fiber block system with a fiber block segment having a rectangular cross section has an improved ability to retain soil behind it because of the increased contact area between the bottom of the rectangular fiber block segment when compared to a fiber block system using a fiber block segment having a circular cross section. Nonetheless, a fiber block system using fiber block segments with a circular cross section can also be used if desired. These and other advantages of the invention will become apparent to a skilled artisan based on his or her review of the following description and the accompanying illustrations.

Therefore, in one preferred embodiment, an erosion control device of a fiber block segment is provided, comprising an elongated fiber block formed of a densely packed elongated thick fibrous material. The fiber block has a fabric wrapped around three sides of the block, wherein the wrapped fabric extends from the block to define a top anchor portion and a bottom anchor portion. The fiber block is securely attached to the wrapped fabric by another fabric or twine spanning the fourth side of the block. Additionally, the fabric is wrapped only up to the edges defining one end (a male end) and beyond the edges defining the opposite end (the female end) to define a pouch-like structure at the female end. In this preferred embodiment, the fiber block is made of coconut fibers (coir), the fabric wrapped around the fiber block is woven from coir twine, and the twine used in securing the wrapped fabric to the fiber block is coir twine.

In accordance with this invention, erosion of a shoreline or waterway bank can be accomplished by installing fiber block segments adjacent the shoreline or waterway bank with the anchor portions extending away from the water. The bottom anchor portions are covered with soil, the soil is compacted, and the top fabric portions are either laid on top of the compacted soil or covered with additional soil. Live plant cuttings and live plants such as willows are planted in the soil underlying or covering the top anchor portions.

The fiber blocks defining the water side faces of fiber block segments enable construction of an erosion control system of a substantially constant height. In general, the slope angle of the bank can be varied by moving the layers of the fiber block segments relative to each other. The fiber block segments are installed over an extended length along the shoreline or waterway bank by connecting fiber block segments end-to-end and mating the male end of one fiber block segment to the female end of an adjacent fiber block segment to create a continuous erosion control system along the shoreline or waterway bank. The pouch at the female end of the fiber block segment securely holds an inserted male end of the adjacent fiber block segment and maintains the continuity and the structural integrity of the system. The weight of soil on top of the anchor portions also keeps the fiber block segments in place. Other arrangements of the fiber block system are described below.

The foregoing general description and the following detailed description are exemplary and explanatory only and do not restrict the claims directed to the invention. The accompanying drawings, which are incorporated in and constitute a part of this specification, illustrate one embodiment of the invention and together with the description, serve to explain the principles of the invention.

V. DETAILED DESCRIPTION OF THE INVENTION

This application refers in detail below to the exemplary embodiments of a self-anchoring fiber block segment 10 according to the invention, which are illustrated in the accompanying drawings. The fiber block segment 10 can be used as a component of a fiber block system 40 to stabilize a shoreline or waterway bank by providing support for and preventing erosion of the soil behind the fiber block system 40 (on the other side of the fiber block system 40 from the side exposed to water). Wherever possible, the application uses the same reference numbers throughout the drawings to refer to the same or similar items.

Figure 1:
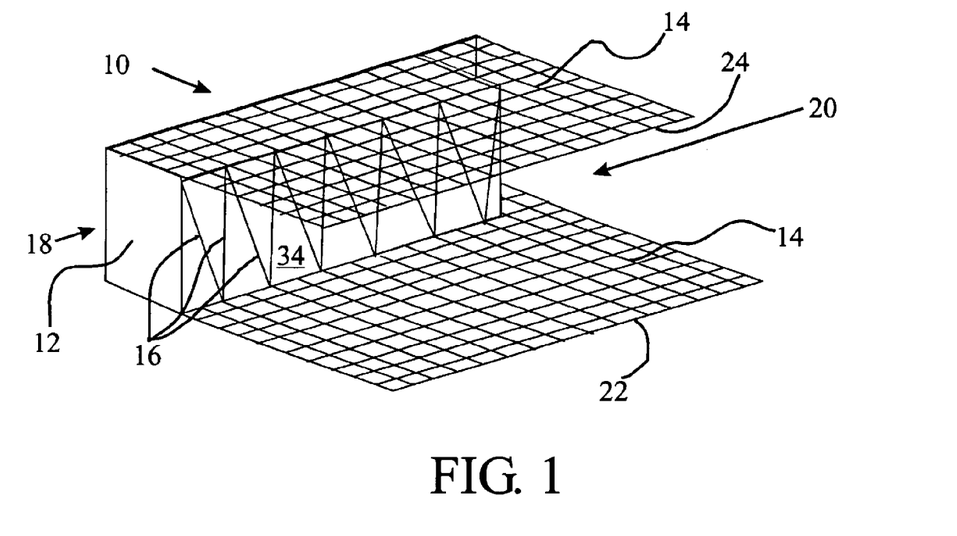
FIG. 1 is a perspective view from the soil side of an embodiment of the fiber block according to the invention.
Figure 2:
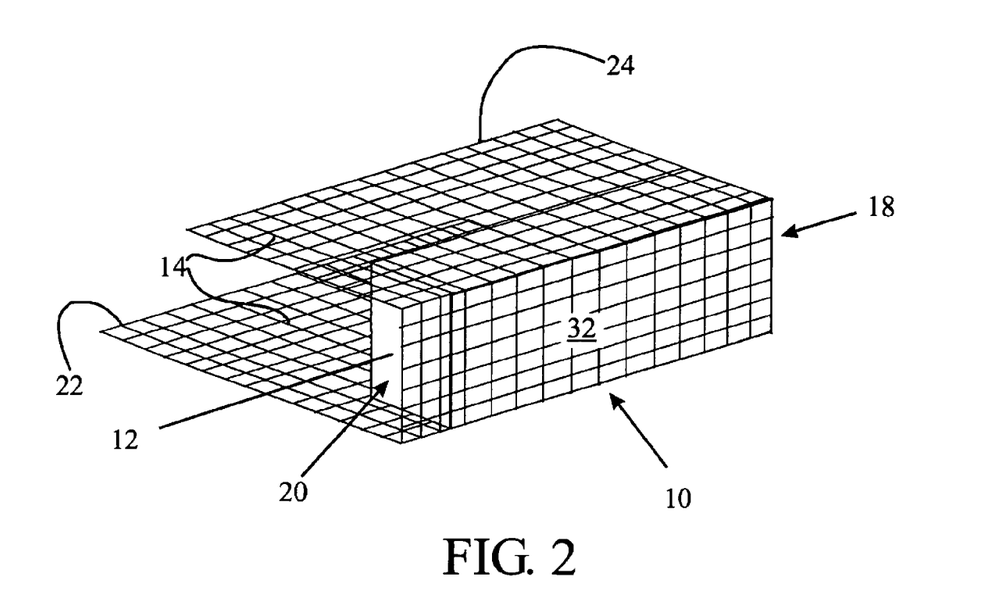
FIG. 2 is a perspective view from the water side of the embodiment of the fiber block system of FIG. 1.
Figure 3:
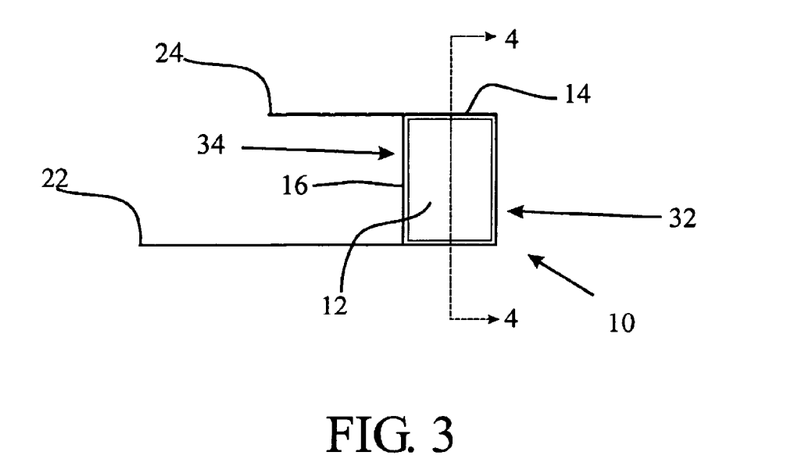
FIG. 3 is a side view of the embodiment of the fiber block system illustrated in FIG. 1.
Figure 4:
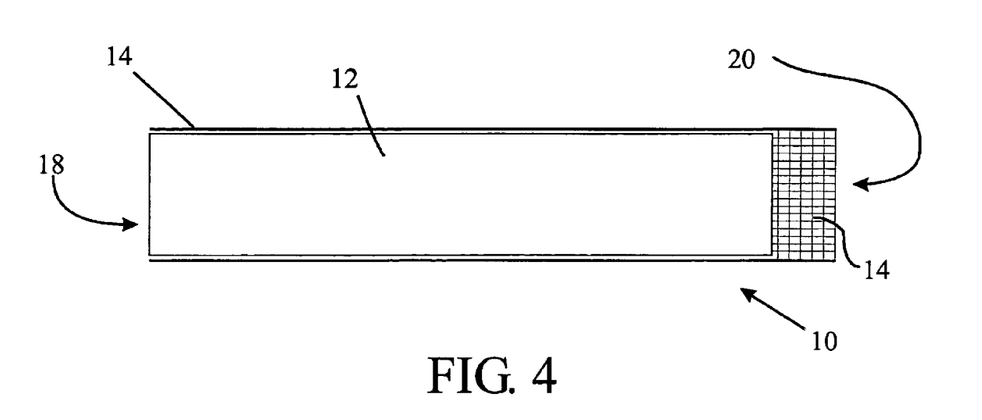
FIG. 4 is a cross sectional view of the fiber block system illustrated in FIG. 1 taken alone line 4—4 of FIG. 3.

FIGS. 1–11 illustrate a first embodiment of a fiber block segment 10 of the self-anchoring fiber block system of the invention. As shown in FIGS. 1 and 2, fiber block segment 10 includes a compressed coir fiber block 12 and a high strength coir fabric 14 wrapped around three sides of the compressed coir fiber block 12. The coir fiber block 12 may also be wrapped with coir twine (not illustrated) to ensure that coir fiber block 12 maintains its shape. When the fiber block 12 is wrapped with twine, the fabric 14 need not surround the fiber block 12, but may be connected to one edge of the fiber block 12 so that it extends from the fiber block to define an anchor portion between the fiber block and the fabric end 22. Additionally, the twine used to weave fabric 14 may be made of coir fibers, other biodegradable fibers, or synthetic fibers, or the twine may be made with biodegradable fibers wrapped around a synthetic core. High strength coir fabric 14 wrapped on compressed coir fiber block 12 includes bottom fabric end 22 and top fabric end 24 (FIGS. 1–3) that extend freely from the back face 34 (facing the soil when installed) of the fiber block segment 10 (FIGS. 1 and 3). FIG. 4 is a cross sectional view of the fiber block illustrated in FIG. 1 taken alone line 4—4 of FIG. 3. Compressed coir fiber block 12 is secured to the high strength coir fabric 14, for example by tying fabric 14 to coir fiber block 12 with coir twine 16 running up and down on the back face 34 of the fiber block segment 10 (FIGS. 1 and 3). High strength coir fabric 14 in fiber block segment 10 is preferably also woven out of coir twine 16. At the male end 18 of the fiber block segment 10, high strength coir fabric 14 is preferably wrapped only up to the end of the compressed coir fiber block 12 (FIGS. 1, 2 and 4). At the female end 20 of the fiber block segment 10, high strength coir fabric 14 is preferably wrapped beyond the end of the compressed coir fiber block 12 creating a pouch like formation (FIGS. 1, 2 and 4).

Figure 5:
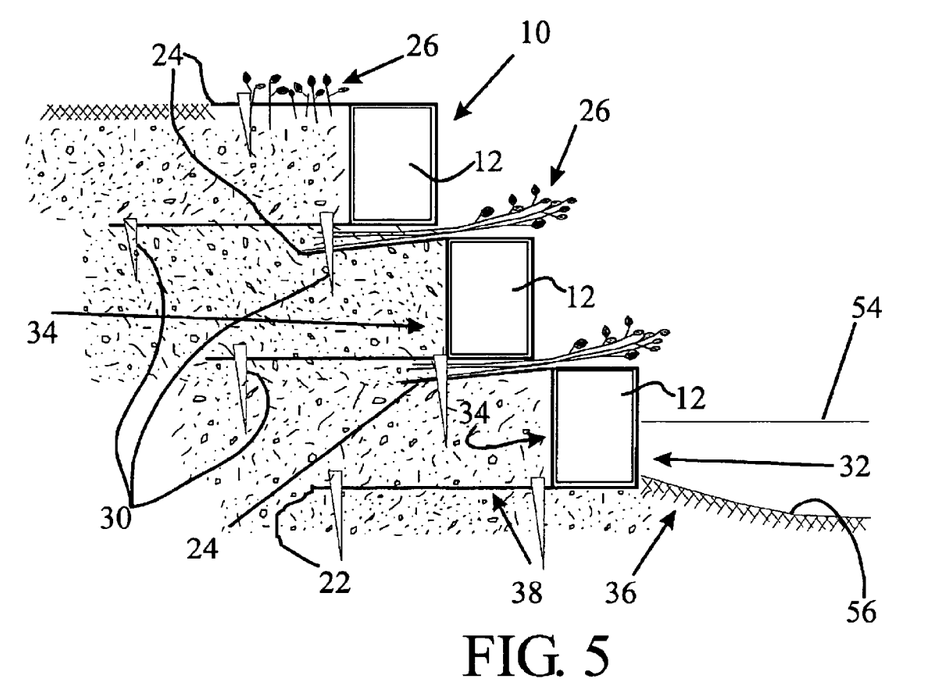
FIG. 5 is a cross sectional side view of the fiber block system illustrated in FIG. 1 as it can be installed in a waterway bank.
Figure 6:
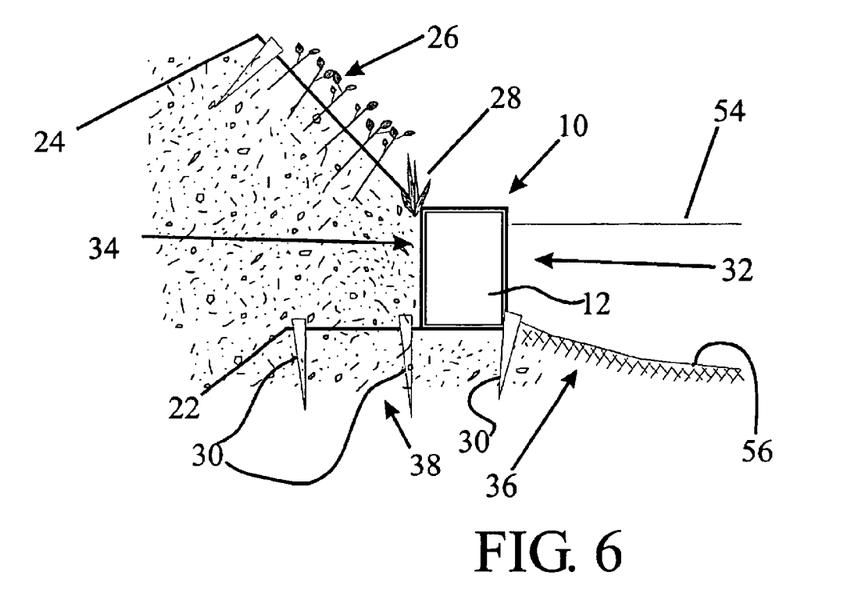
FIG. 6 is a cross sectional side view of the fiber block system illustrated in FIG. 1 as it alternatively can be installed in a waterway bank.

FIGS. 5–9 illustrate the use of the fiber block segments 10 to restore an eroded shoreline or waterway bank or protect a shoreline or waterway bank from erosion. A fiber block segment is placed on the shoreline or waterway bank with front face 32 of fiber block segment 10 facing water side 36 and back face 34 of fiber block segment 10 facing the bank side 38 (FIGS. 5 and 6). The bottom fabric end 22 extends away from water side 36 and wooden wedges 30 are driven through fabric 14 to keep fabric end 22 in place. Fabric 14 from coir fiber block 12 to fabric end 22 is covered with soil up to about the height of fiber block segment 10 and the soil is compacted. Fabric end 24 is extended away from water side 36 such that fabric 14 covers the compacted soil. Wooden wedges 30 can be driven through fabric 14 atop the compacted soil to secure top fabric end 24 in place. Because none of wooden wedges is exposed to or submerged under water, the buoyancy of wooden wedges 30 will not tend to work wooden wedges loose from their securing position.

FIG. 5 illustrates a fiber block system constructed in three vertical layers of stacked fiber block segments 10 which results in a shoreline or waterway bank of a desired height. In this installation, multiple layers of fiber block segments 10 filled with soil are arranged to reconstruct the waterway bank. As shown in FIG. 5, a preferred slope angle of the bank is achieved by moving back each subsequent upper layer toward bank side 38. Additionally, coir fiber blocks 12 can be stacked atop each other at a steeper angle than raw soil. Live plant cuttings 26 are planted on soil between layers of fiber block segments 10 and on the top layer of soil through the fabric 14 extending from the top fiber block segment 10 toward the fabric end 24 of this top fiber block segment 10. FIG. 5 and FIG. 6 show use of wooden wedges 30 to maintain connections between fiber block segments 10 or between existing soil and fiber block segment 10. Without wooden wedges 30, fiber block segments 10 may tend to move away from their positions during soil filling. Once filling and compacting of soil is done on bottom fabric end 22, cover it with top fabric end 24 the anchoring of the fiber block segment 10 is come from the weight of soil filled on its bottom fabric end 22. This self-anchoring feature of installed fiber block segment 10 guarantees its stability and eliminates the extensive use of external anchors.

FIG. 6 illustrates a fiber block system that includes one vertical layer of fiber block segments 10 to construct a shoreline or waterway bank of a shorter desired height. In this installation, live plant cuttings 26 and live plants 28 are inserted on the soil through the top fabric end 24 to help stabilize the soil on the bank above fiber block segment 10. The use of fabric 14 on top of the soil also permits coir blocks 12 to be stacked atop each other at a steeper angle than for coir fiber blocks without fabric 14 connected to the top of coir fiber block 12.

Figure 7:
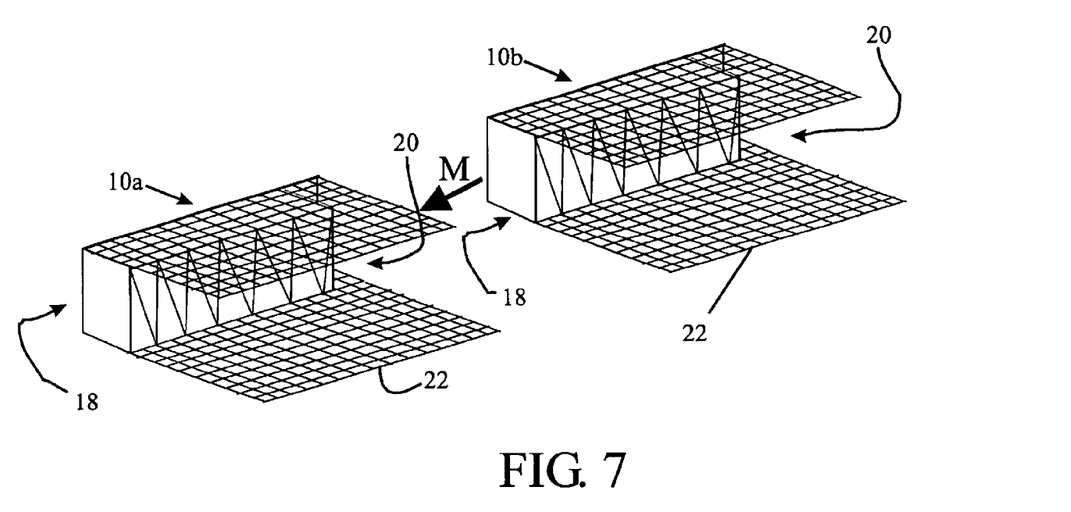
FIG. 7 is a perspective view showing how the two fiber blocks as shown in FIGS. 1 and 2 can be arranged to be mated end-to-end.
Figure 8:
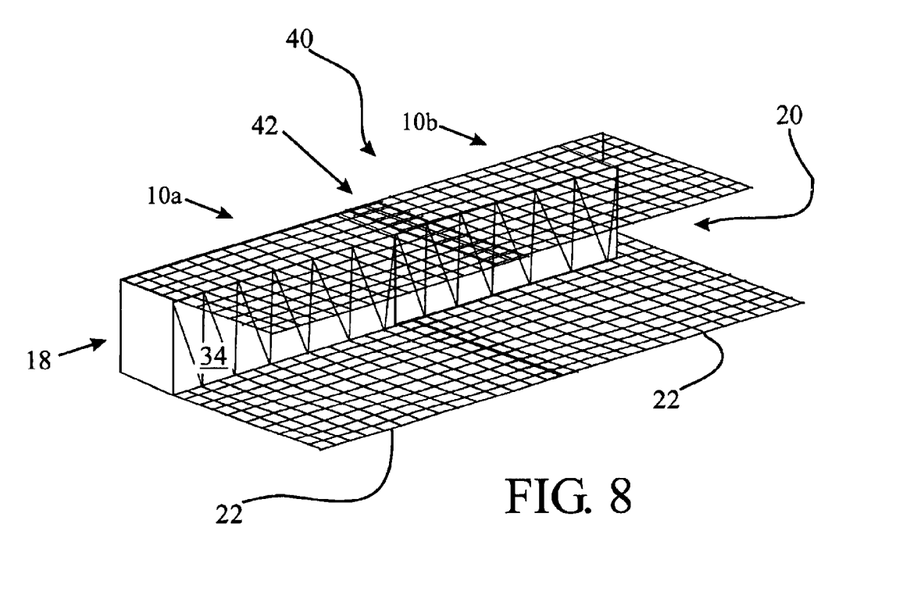
FIG. 8 is a perspective view illustrating the two fiber block systems of FIG. 7 in a mated condition to make a continuous fiber block system.

FIGS. 7 and 8 illustrate how two fiber block segments 10a and 10b can be connected at the joint 42 to form a fiber block system 40 that can extend indefinitely and continuously along a shoreline or waterway bank. When connecting two fiber block segments 10a and 10b in the field, the male end 18 of fiber block segment 10b is mated with female end 20 of fiber block segment 10a. For example, fiber block segment 10b can be moved in direction M to form a joint 42 with fiber block segment 10a in which fabric 14 of the fiber block segment 10a overlaps the coir block 12 and fabric 14 of fiber block segment 10b. The fabric 14 from the face 34 to the bottom fabric end 22 of each fiber block segment 10a and 10b is covered with soil as described above. The pouch like formation in the female end 20 supports and holds inserted male end 18 in place and maintains the continuity of front face 32 and back face 34 of fiber block segment 10 without any separate connecting hardware. By repeating this procedure and adding inserting the male end 18 of a fiber block segment 10 into the exposed female end 20 of another fiber block segment 10, a series of fiber block segments 10 can be installed easily along the entire desired length of the shoreline or waterway bank.

Figure 9:
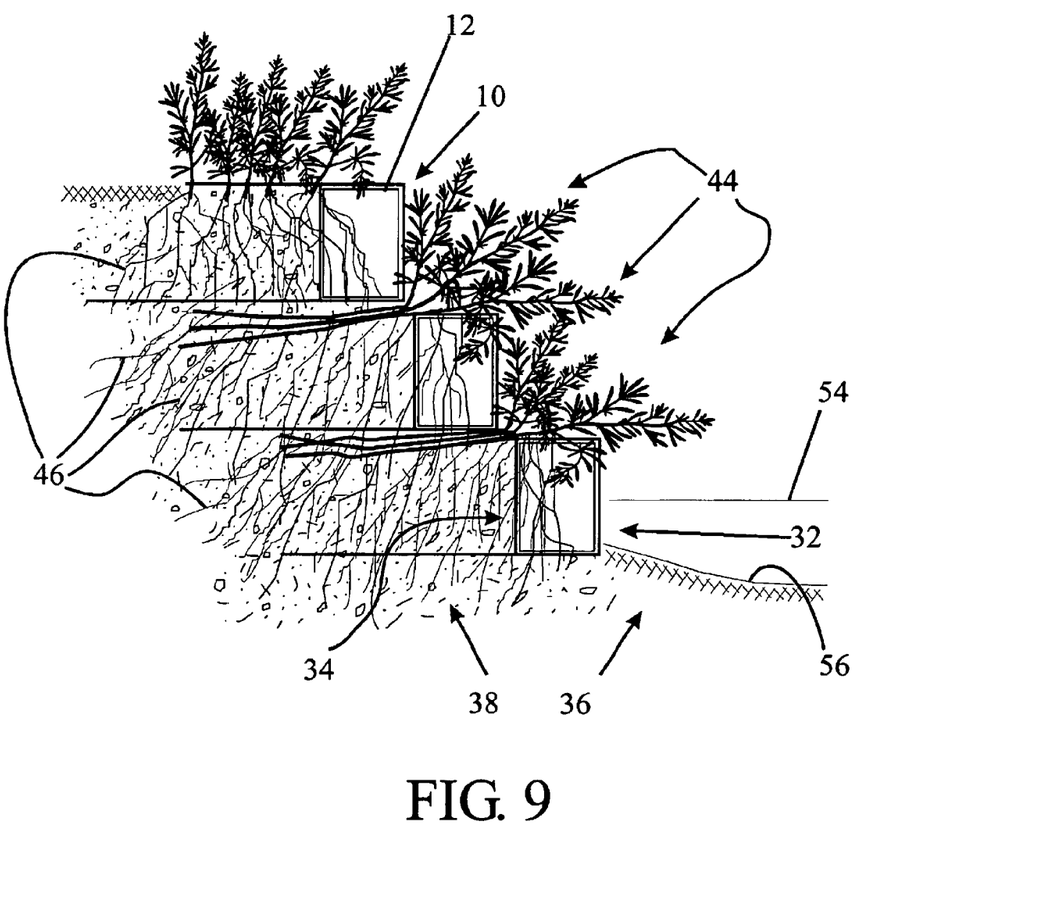
FIG. 9 is a cross sectional side view of the installation of the fiber block system illustrated FIG. 5 several years after it was installed in a waterway bank.

FIG. 9 is a cross sectional side view of the installation of the fiber block system illustrated FIG. 5 several years after it was installed in a waterway bank. In time, grown plants 44 cover the bank and roots 46 of the grown plants 44 grow into the waterway bank or shoreline behind the coir fiber blocks 12. These roots 46 may extend through the fiber block 12 and fabric 14 to hold the fiber block segments 10 in place and effectively contain and restrain the soil in the bank behind the fiber block segments 10. By doing this, roots 46 hold fiber block segments 10 and so that the fiber block segments 10 protect the bank until they degrade (typically 5–10 years). By the time the biodegradable fiber block segments 10 have completely decayed, the mature grown plants 44 and roots 46 in the soil mass behind the fiber block segments 10 easily and naturally resist the erosive forces created by water flowing in a waterway or by wave action along a shoreline.

Figure 10A:
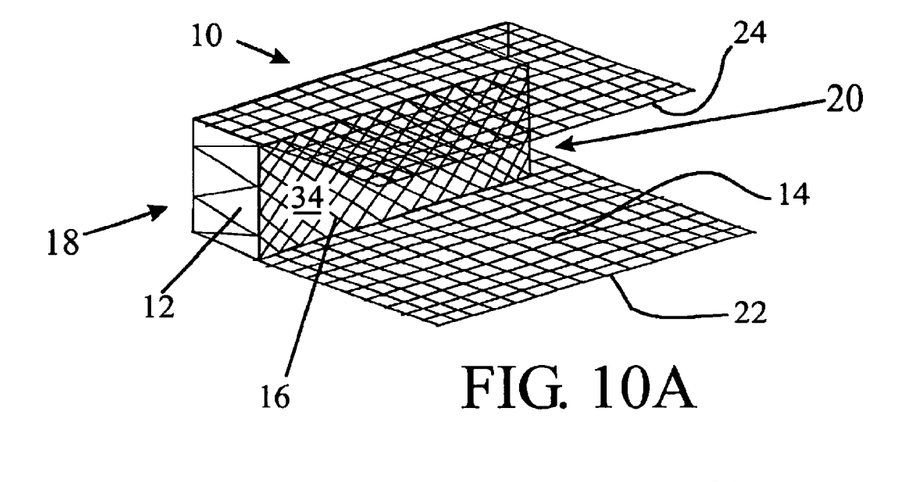
FIG. 10A is a perspective view from the soil side of a first alternative embodiment of the fiber block system of the invention.
Figure 10B:
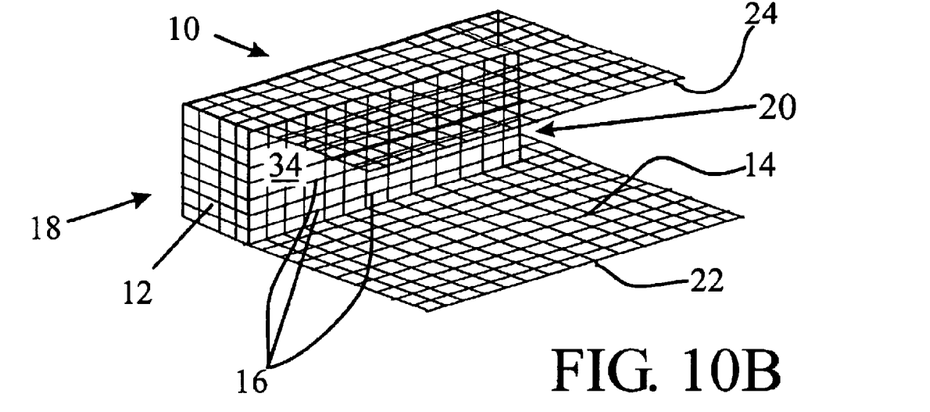
FIG. 10B is a perspective view from the soil side of second alternative embodiment of the fiber block system of the invention.
Figure 10C:
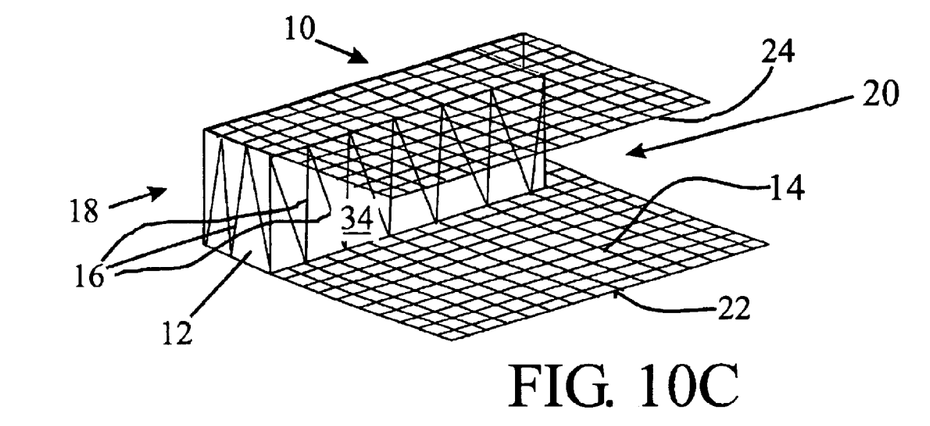
FIG. 10C is a perspective view from the soil side of a third alternative embodiment of the fiber block system of the invention.

FIGS. 10A, 10B and 10C are perspective views of first, second, and third alternative embodiments respectively of the fiber block segment 10 according to the invention. As shown in these figures, compressed coir fiber block 12 is secured to the high strength coir fabric 14 by coir twine 16 extending across back face 34 and optionally extending across the male end 18 and/or the female end 20 of the fiber block segment 10. These figures primarily illustrate differing weaving patterns for twine 16 that is used to tie fabric 14 to coir block 12.

Figure 11A:
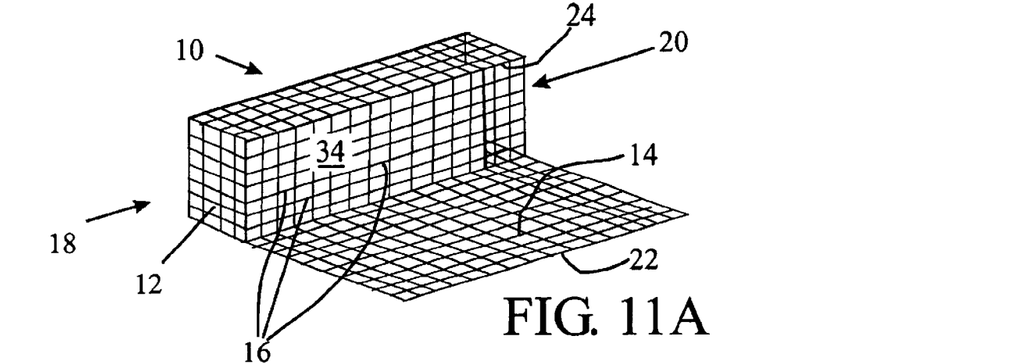
FIG. 11A is a perspective view from the soil side of a fourth alternative embodiment of the fiber block system of the invention.
Figure 11B:
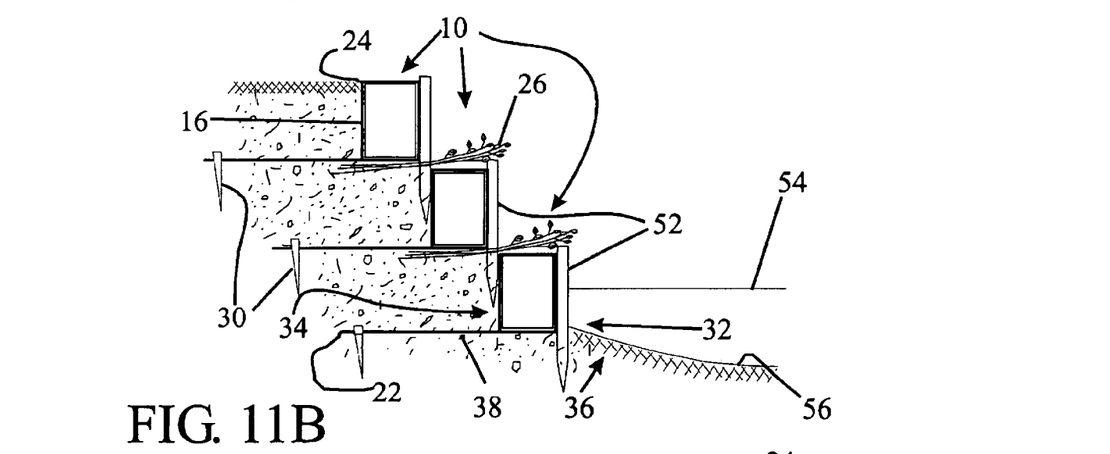
FIG. 11B is a cross sectional side view of the fiber block system illustrated in FIG. 11A as it can be installed in a waterway bank.
Figure 11C:
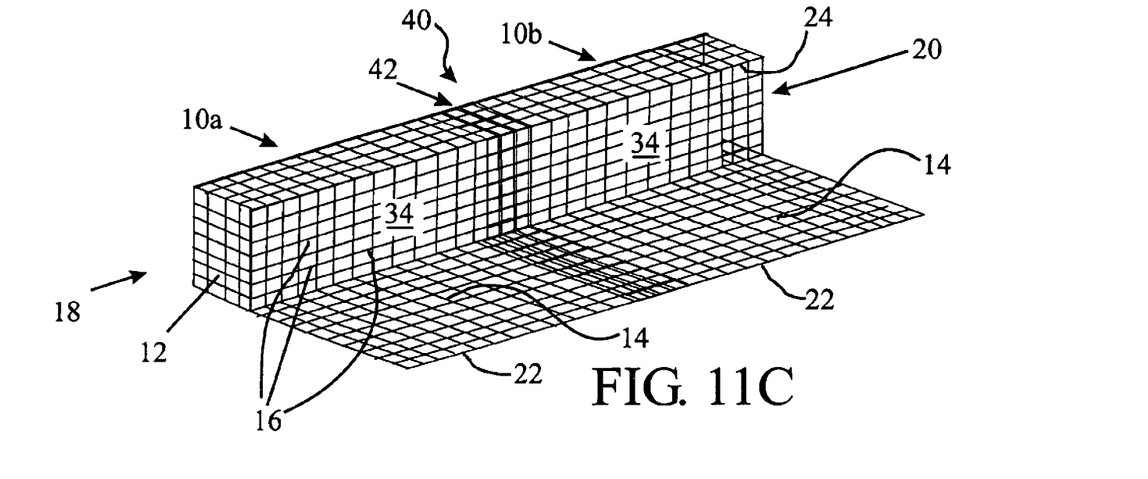
FIG. 11C is a perspective view showing how the two fiber block systems, shown in the FIG. 11A, are arranged to make a continuous fiber block system.

FIG. 11A is a perspective view from the soil side of a fourth alternative embodiment of a fiber block segment 10 according to the invention. In this embodiment, top fabric end 24 extends only to back face 34 of the fiber block segment 10. FIG. 11B is a cross sectional side view of application of fiber block segment 10 shown in FIG. 11A in a waterway bank. In this installation, fabric 14 from face 34 to bottom fabric end 22 is covered with soil to anchor the fabric 14 and thus fiber block segment 10 to the soil. Because top fabric end 24 does not extend past the edge of coir fiber block 12, soil cannot be used to anchor the top edge of fiber block segment 10 shown in FIG. 11A. Wooden stakes 52 are driven into the soil adjacent front face 32 to support coir block 12 (with its relatively unrestrained top fabric end 24) from toppling toward the surface 52 of the water in stream bed 56. However, wooden stakes 52 do not effectively anchor fiber block segments 10 to the soil. FIG. 11C illustrates how fiber block segment 10a can be connected to fiber block segment 10b to form a fiber block system 40. The male end 18 of fiber block segment 10b is inserted to the female end 20 of fiber block segment 10a to form joint 42. There is a slit left to permit the bottom portion of fabric 14 to pass through fabric 14 surrounding female end 20. This arrangement of female end 20 enables fiber block segment 10a to mate with fiber block segment 10b without any twine tying the two segments to each other.

Figure 12A:
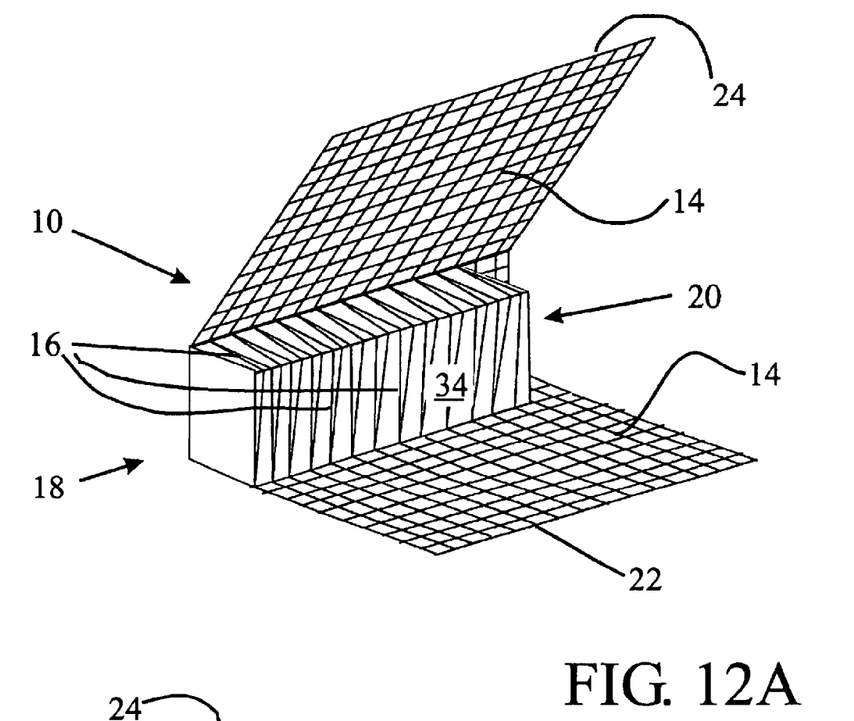
FIG. 12A is a perspective view from the soil side of a fifth alternative embodiment of the fiber block system of the invention.
Figure 12B:
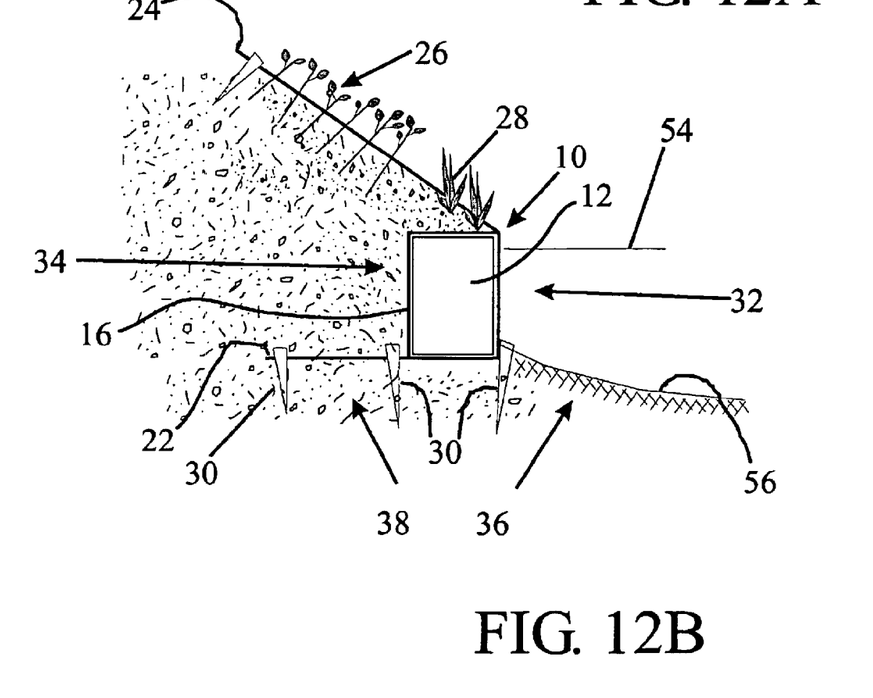
FIG. 12B is a cross sectional side view of the fiber block system illustrated in FIG. 12A as it can be installed in a waterway bank.

FIG. 12A is a perspective view from the soil side of a fifth alternative embodiment of a fiber block segment 10 according to the invention. In this embodiment, fabric 14 is connected to the edge of coir block 12 defined by the top of coir block 12 and front face 32 (rather than the edge defined by the top of coir block 12 and back face 34). Thus, fabric 14 covering the top of coir block 12 is free to move away from the top of coir block 12. This feature is achieved by tying fiber block 12 to the high strength coir fabric 14 at top of front face 32 and bottom of back face 34 using coir twine 16. This embodiment is particularly suited for installation in which the soil on the bank above the topmost layer of fiber block segments 10 is angled (see, e.g., FIG. 12B illustrating a such an installation with a single layer of fiber block segments 10).

Figure 13A:
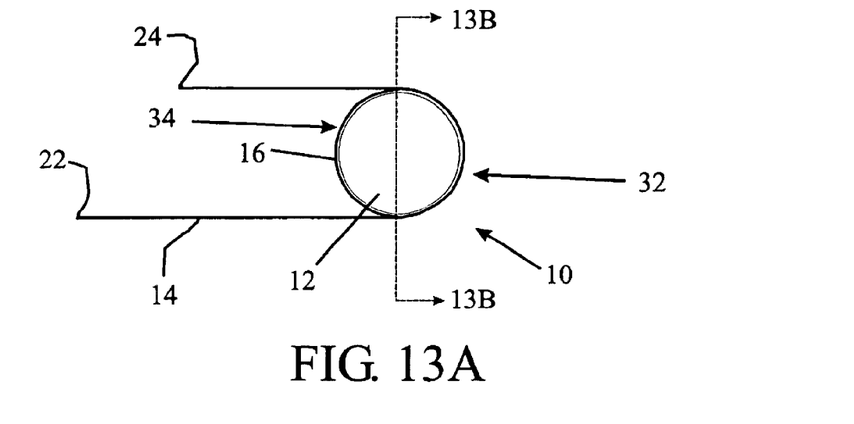
FIG. 13A is a side view of a sixth alternative embodiment of the fiber block system of the invention.
Figure 13B:
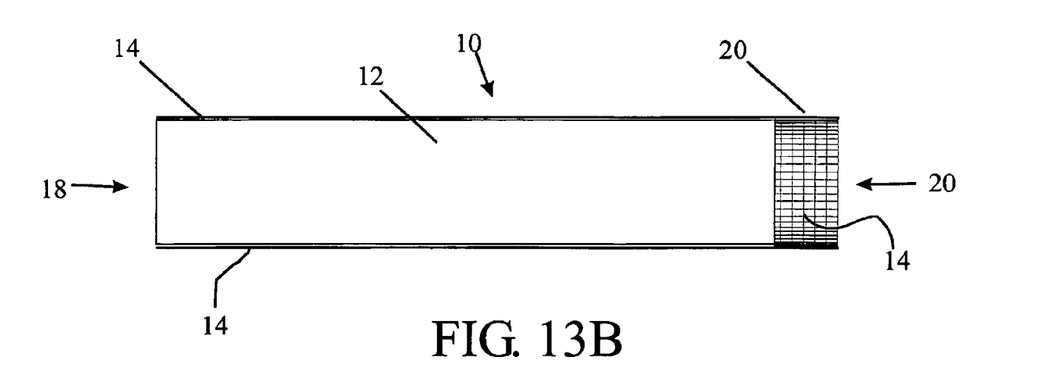
FIG. 13B is a cross sectional view taken alone line 13B—13B of FIG. 13A.
Figure 13C:
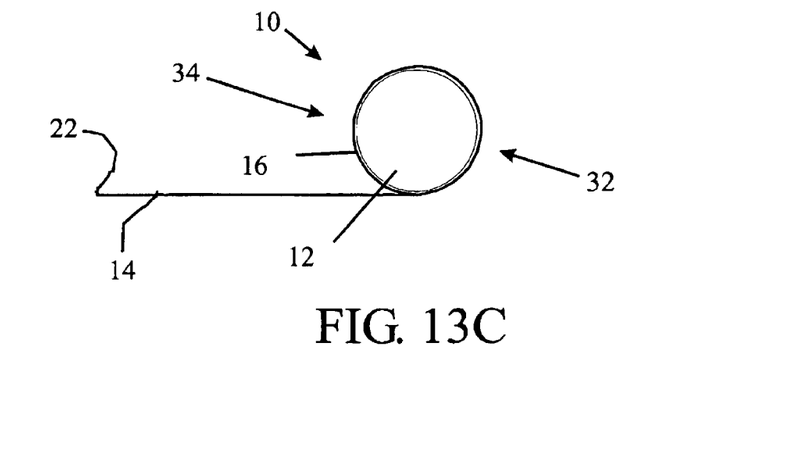
FIG. 13C is a side view of a seventh alternative embodiment of the fiber block system of the invention.

FIG. 13A is a side view of a sixth alternative embodiment of a fiber block segment 10 according to the invention. In this embodiment, coir block 12 has an approximately circular cross section. FIG. 13B is a cross sectional view of FIG. 13A along the line of 13B—13B of FIG. 13A. FIG. 13C is a side view of a seventh alternative embodiment of the fiber block segment 10 according to the invention. In this embodiment, shape of cross section in the fiber block 12 is circular and top fabric end 24 ends at the topmost point of the circular cross section of coir block 12.

Rectangular coir fiber block 12 of the fiber block segment 10 can be made, for example, in dimensions of 10 feet in length, 16 inches in height and 9 inches in thickness. It is also easily possible to vary these dimensions and change the size of the fiber block segment 10. Each size could have its advantages according to application in the field. As described earlier, it is also possible to use circular block in different diameters in place of rectangular fiber block 12 to create the fiber block segment 10 explained in FIG. 13A, FIG. 13B and FIG. 13C.

Other embodiments of the invention will be apparent to those skilled in the art from their consideration of the specification and practice of the invention disclosed in this document. The applicant intends that the specification and examples be considered as exemplary only, with the true scope and spirit of the invention being indicated by the following claims.

What is claimed is:

1. A fiber block system for stabilizing a shoreline or waterway bank, comprising:
    A. a first fiber block segment, comprising:
        i. an elongated first fiber block defining:
            a. a first top surface,
            b. a first bottom surface,
            c. a first soil side surface,
            d. a first water side surface,
            e. a first male end portion, and
            f. a first female end portion disposed generally opposite the first male end portion;
        ii. a first sheet of fabric attached to the first fiber block that:
            a. extends from the first fiber block in a direction away from the first water side surface to define a first free bottom end with a first bottom anchoring portion, and
            b. extends from the first female end portion of the first fiber block to define a first female mating portion;
    B. a second fiber block segment, comprising:
        i. an elongated second fiber block defining:
            a. a second top surface,
            b. a second bottom surface,
            c. a second soil side surface, d. a second water side surface,
e. a second male end portion, and
f. a second female end portion disposed generally opposite the second male end portion;
ii. a second sheet of fabric attached to the second fiber block that:
a. extends from the second fiber block in a direction away from the second water side surface to define a second free bottom end to with a second bottom anchoring portion, and
b. extends from the second female end portion of the second fiber block to define a second female mating portion.

2. The fiber block system of claim 1, in which the first sheet of fabric:
A. substantially covers the first water side surface and the first bottom surface, and
B. extends from the first fiber block in a direction away from the first water side surface to define a first free top end with a first top anchoring portion.

3. A fiber block system for stabilizing a shoreline or waterway bank, comprising:
A. a first fiber block segment, comprising:
i. an elongated first fiber block defining:
a. a first top surface,
b. a first bottom surface,
c. a first soil side surface,
d. a first water side surface,
e. a first male end portion, and
f. a first female end portion disposed generally opposite the first male end portion;
ii. a first sheet of fabric attached to the first fiber block that:
a. extends from the first fiber block to a first free bottom end to define a first bottom anchoring portion,
b. extends from the first female end portion of the first fiber block to define a first female mating portion,
c. substantially covers the first water side surface and the first bottom surface, and
d. extends from the first fiber block to a first free top end to define a first top anchoring portion that is substantially covered with soil;
B. a second fiber block segment, comprising:
i. an elongated second fiber block defining:
a. a second top surface,
b. a second bottom surface,
c. a second soil side surface,
d. a second water side surface,
e. a second male end portion, and
f. a second female end portion disposed generally opposite the second male end portion;
ii. a second sheet of fabric attached to the second fiber block that extends from the:
a. second fiber block to a second free bottom end to define a second bottom anchoring portion,
b. second female end portion of the second fiber block to define a second female mating portion, and
c. second fiber block to a second free top end to define a second top anchoring portion;
C. the second fiber block segment is positioned above the first fiber block segment such that:
i. the second bottom anchoring portion is:
a. positioned above a plane defined by the first top anchoring portion and
b. covered with soil, and
ii. the second top anchoring portion is positioned on top of the soil.

4. The fiber block system of claim 2, in which the first fiber block segment and the second fiber block segment are arranged such that the second male end portion mates with the first female mating portion.

5. The fiber block system of claim 4, further comprising coir twine that attaches the first sheet of fabric to the first fiber block and extends across the first soil side surface so that the first fabric sheet substantially covers the first top surface.

6. A fiber block system for stabilizing a shoreline or waterway bank, comprising:
A. a first fiber block segment, comprising:
i. an elongated first fiber block defining:
a. a first top surface,
b. a first bottom surface,
c. a first soil side surface,
d. a first water side surface,
e. a first male end portion, and
f. a first female end portion disposed generally opposite the first male end portion;
ii. a first sheet of fabric attached to the first fiber block that:
a. extends from the first fiber block to a first free bottom end to define a first bottom anchoring portion,
b. extends from the first female end portion of the first fiber block to define a first female mating portion,
c. substantially covers the first water side surface and the first bottom surface, and
d. extends from the first fiber block to a first free top end to define a first top anchoring portion that is substantially covered with soil;
B. a second fiber block segment comprising:
i. an elongated second fiber block defining:
a. a second top surface,
b. a second bottom surface,
c. a second soil side surface,
d. a second water side surface,
e. a second male end portion, and
f. a second female end portion disposed generally opposite the second male end portion;
ii. a second sheet of fabric attached to the second fiber block that extends from the:
a. second fiber block to a second free bottom end to define a second bottom anchoring portion,
b. second female end portion of the second fiber block to define a second female mating portion, and
c. second fiber block to a second free top end to define a second top anchoring portion;
C. the first fiber block segment and the second fiber block segment are arranged such that the second male end portion mates with the first female mating portion; and
D. coir twine that:
i. attaches the first sheet of fabric to the first fiber block and
ii. extends across the first top surface and the first soil side surface so that the first top anchoring portion extends away from the first fiber block near an intersection of the first water side surface and the first top surface.

7. The fiber block system of claim 6, in which the coir twine also extends across the first male end portion.

8. The fiber block system of claim 6, in which the second sheet of fabric extends from the second fiber block to a second free top end to define a second top anchoring portion.

9. The fiber block system of claim 8, in which the coir twine is connected to the first top anchoring portion and the first bottom anchoring portion.

10. The fiber block system of claim 9, in which the first bottom anchoring portion at least partially overlaps the second bottom anchoring portion.

11. The fiber block system of claim 10, in which the first top anchoring portion at least partially overlaps the second top anchoring portion.

12. The fiber block system of claim 11, in which the first fiber block and the second fiber block are positioned adjacent a shoreline or waterway beck such that the first water side surface and the second water side surface face the water and soil covers the first bottom anchoring portion and the second bottom anchoring portion.

13. The fiber block system of claim 12, further comprising a first wedge driven through the first bottom anchoring portion to secure the first bottom anchoring portion to the surrounding soil.

14. The fiber block system of claim 13, in which the first wedge is also driven through the second bottom anchoring portion to secure the second bottom anchoring portion to the surrounding soil.

15. The fiber block system of claim 14, in which soil covers the first top anchoring portion of the first sheet of fabric and the second top anchoring portion of the second sheet of fabric.

16. The fiber block system of claim 15, further comprising a second wedge driven through the first top anchoring portion to secure the first top anchoring portion to the surrounding soil.

17. The fiber block system of claim 16, in which the second wedge is also driven through the second top anchoring portion to secure the second top anchoring portion to the surrounding soil.

18. The fiber block system of claim 14, in which the first top anchoring portion and the second top anchoring portion are positioned on top of the soil.

19. The fiber block system of claim 18, further comprising a second wedge driven through the first top anchoring portion to secure the first top anchoring portion to the surrounding soil.

20. The fiber block system of claim 19, in which the second wedge is also driven through the second top anchoring portion to secure the second top anchoring portion to the surrounding soil.

21. The fiber block system of claim 20, further comprising plants that are planted in the soil underlying the first top anchoring portion.

22. The fiber block system of claim 21, further comprising plants that are planted in the soil underlying the second top anchoring portion.

23. The fiber block system of claim 1, in which the first fiber block has an approximately circular cross section in a plane perpendicular to a longitudinal axis of the first fiber block.

24. The fiber block system of claim 1, in which the first fiber block has an approximately rectangular cross section in a plane perpendicular to a longitudinal axis of the first fiber block.

25. A fiber block segment for use in a fiber block system for stabilizing a shoreline or waterway bank, comprising:
A. an elongated fiber block defining:
i. a top surface,
ii. a bottom surface,
iii. a soil side surface,
iv. a water side surface,
v. a male end portion, and
vi. a female end portion disposed generally opposite the male end portion; and
B. a sheet of fabric attached to the fiber block that:
i. extends from the fiber block in a direction away from the water side surface to define a free bottom end with a bottom anchoring portion, and
ii. extends from the female end portion of the fiber block to define a female mating portion.

26. The fiber block segment of claim 25, in which the sheet of fabric:
A. substantially covers the water side surface and the bottom surface, and
B. extends from the fiber block in a direction away from the water side surface to define a free top end with a top anchoring portion.

27. The fiber block segment of claim 26, further comprising coir twine that attaches the sheet of fabric to the fiber block and extends across the soil side surface so that the fabric sheet substantially covers the top surface.

28. A fiber block segment for use in a fiber block system for stabilizing a shoreline or waterway bank, comprising:
A. an elongated fiber block defining:
i. a top surface,
ii. a bottom surface,
iii. a soil side surface,
iv. a water side surface,
v. a male end portion, and
vi. a female end portion disposed generally opposite the male end portion; and
B. a sheet of fabric attached to the fiber block that:
i. extends from the fiber block to a free bottom end to define a bottom anchoring portion,
ii. extends from the female end portion of the fiber block to define a female mating portion,
iii. substantially covers the water side surface and the bottom surface, and
iv. extends from the fiber block to a free top end to define a top anchoring portion; and
C. coir twine that:
i. attaches the sheet of fabric to the fiber block and
ii. extends across the top surface and the soil side surface so that the top anchoring portion extends away from the fiber block near an intersection of the water side surface and the top surface.

29. The fiber block segment of claim 28, in which the coir twine also extends across the male end portion.

30. The fiber block segment of claim 28, in which the coir twine is connected to the top anchoring portion and the bottom anchoring portion.

31. The fiber block segment of claim 30, in which the fiber block is positioned adjacent a shoreline or waterway back such that the water side surface faces the water and soil covers the bottom anchoring portion of the sheet of fabric.

32. The fiber block segment of claim 31, further comprising a wedge driven through the bottom anchoring portion to secure the bottom anchoring portion to the surrounding soil.

33. The fiber block segment of claim 32, in which soil covers the top anchoring portion of the sheet of fabric.

34. The fiber block segment of claim 33, further comprising a second wedge driven through the top anchoring portion to secure the top anchoring portion to the surrounding soil.

35. The fiber block segment of claim 32, in which the top anchoring portion of the sheet of fabric is positioned on top of the soil.

36. The fiber block segment of claim 35, further comprising a second wedge driven through the top anchoring portion to secure the top anchoring portion to the surrounding soil.

37. The fiber block segment of claim 36, further comprising plants that are planted in the soil underlying the top anchoring portion.

38. A method of stabilizing a shoreline or waterway bank, comprising the steps of:
- A. positioning a first fiber block segment adjacent the shoreline or waterway bank, the first fiber block segment, comprising:
  - i. an elongated first fiber block defining:
    - a. a first top surface,
    - b. a first bottom surface,
    - c. a first soil side surface,
    - d. a first water side surface,
    - e. a first male end portion, and
    - f. a first female end portion disposed generally opposite the first male end portion;
  - ii. a first sheet of fabric attached to the first fiber block that:
    - a. substantially covers the first water side surface and the first bottom surface,
    - b. extends from the first fiber block to a first free bottom end to define a first bottom anchoring portion, and
    - c. extends from the first female end portion of the first fiber block to define a first female mating portion;
- B. positioning a second fiber block segment adjacent the shoreline or waterway bank, the second fiber block segment, comprising:
  - i. an elongated second fiber block defining:
    - a. a second top surface,
    - b. a second bottom surface,
    - c. a second soil side surface,
    - d. a second water side surface,
    - e. a second male end portion, and
    - f. a second female end portion disposed generally opposite the second male end portion;
  - ii. a second sheet of fabric attached to the second fiber block that:
    - a. substantially covers the second water side surface and the second bottom surface,
    - b. extends from the second fiber block to a second free bottom end to define a second bottom anchoring portion, and
    - c. extends from the second female end portion of the second fiber block to define a second female mating portion; and
- C. mating the second male end portion to the first female end portion;
- D. driving a wedge through the first bottom anchoring portion into the soil underlying the first bottom anchoring portion; and
- E. covering the first bottom anchoring portion and the second bottom anchoring portion with soil.

39. The method of claim 38, in which the first sheet of fabric extends from the first fiber block to a first free top end to define a first top anchoring portion and the second sheet of fabric extends from the second fiber block to a second free top end to define a second top anchoring portion.

40. The method of claim 39, further comprising the steps of:
- A. positioning the first top anchoring portion and the second top anchoring portion on top of the soil covering the first bottom end portion and the second bottom end-portion;
- B. driving a first wedge through the first bottom anchoring portion into the soil underlying the first bottom anchoring portion;
- C. driving a second wedge through the second bottom anchoring portion into the soil underlying the second bottom anchoring portion;
- D. planting vegetation in the soil underlying the first top anchoring portion and the soil underlying the second top anchoring portion.

41. The method of claim 39, further comprising the steps of:
- A. positioning the first top anchoring portion and the second top anchoring portion on top of the soil covering the first bottom end portion and the second bottom end portion;
- B. driving a first wedge through the first bottom anchoring portion into the soil underlying the first bottom anchoring portion;
- C. driving a second wedge through the second bottom anchoring portion into the soil underlying the second bottom anchoring portion;
- D. covering the first top anchoring portion and the second top anchoring portion with additional soil;
- E. planting vegetation in the soil covering the first top anchoring portion and the soil covering the second top anchoring portion.

* * * * *